May 1, 1928.
J. F. SMILEY
1,668,289
MERCHANDISE DISPLAYING AND ADVERTISING MEANS
Filed May 26, 1927   2 Sheets-Sheet 1
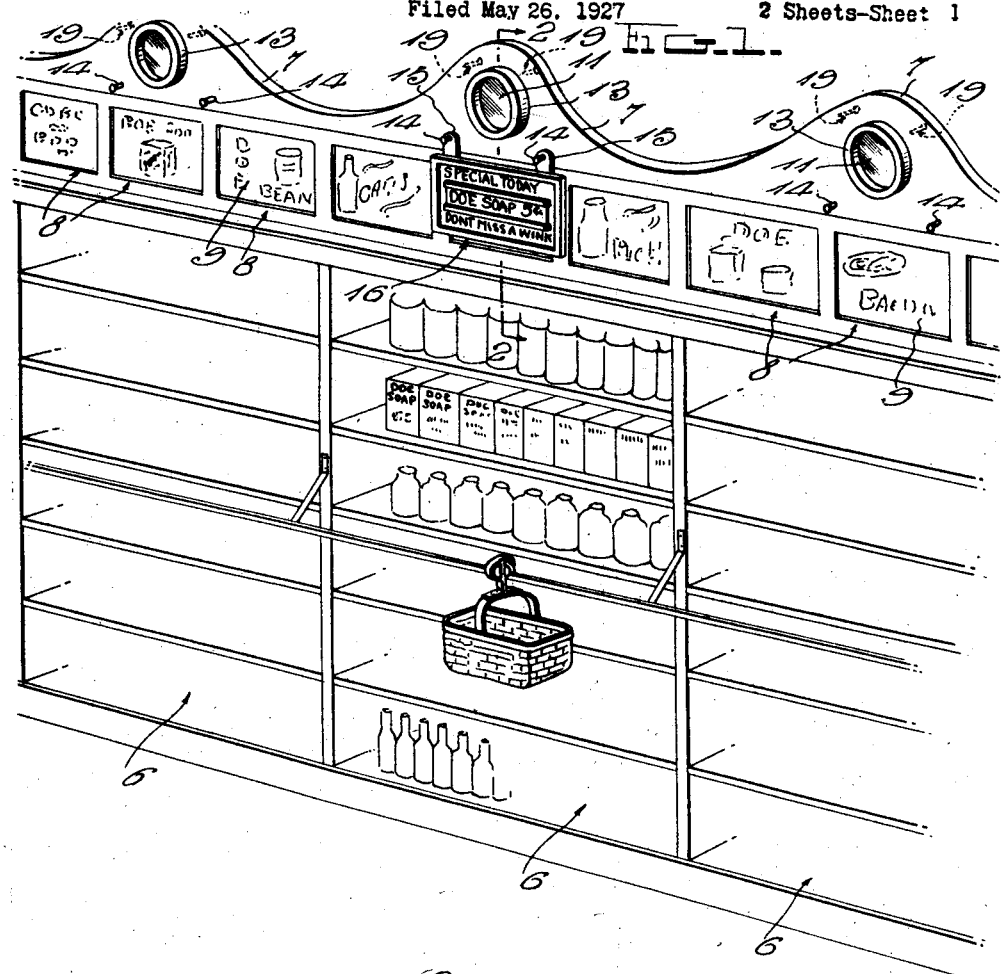
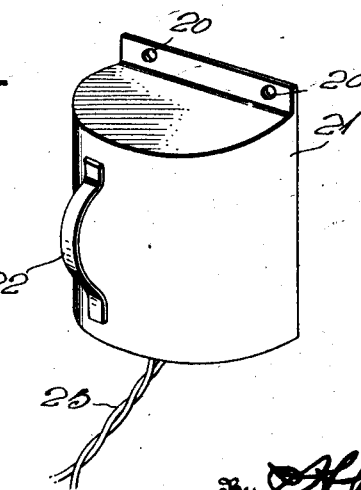
Witness
H. Woodard
Inventor
JOHN F. SMILEY
By H. B. Wilson & Co.
Attorneys May 1, 1928.
J. F. SMILEY
1,668,289
MERCHANDISE DISPLAYING AND ADVERTISING MEANS
Filed May 26, 1927    2 Sheets-Sheet 2
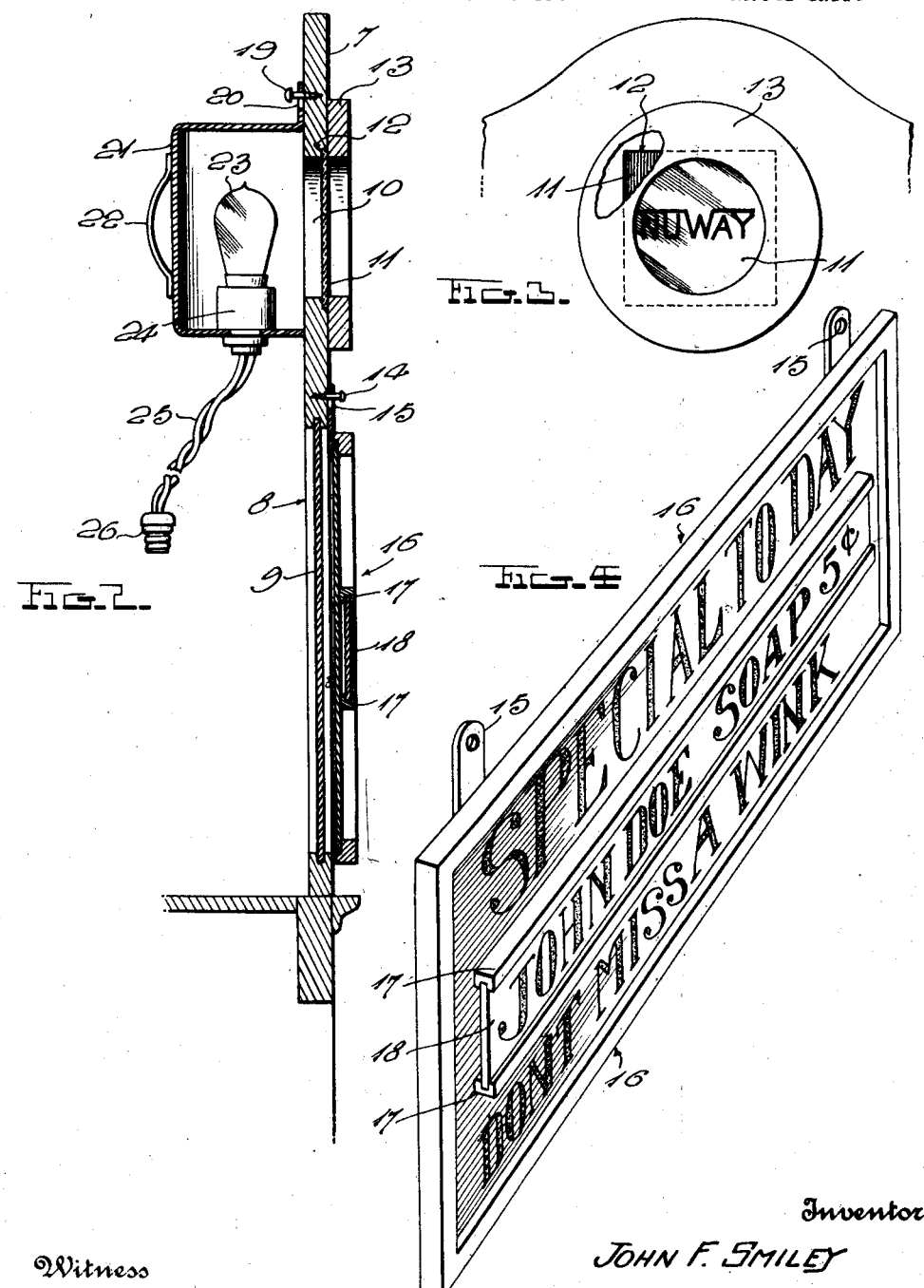
Inventor
JOHN F. SMILEY
Witness
H. Woodard
By H. B. Wilson Yeo
Attorneys Patented May 1, 1928.

1,668,289

UNITED STATES PATENT OFFICE.

JOHN FIELDS SMILEY, OF DALLAS, TEXAS.

MERCHANDISE DISPLAYING AND ADVERTISING MEANS.

Application filed May 26, 1927. Serial No. 194,436.

In a well known form of self-service store, groups of superposed shelves are provided, having individual merchandise advertising panels, which panels are provided with holders for advertising cards of the same character as those commonly used in street car advertising. I propose to augment the panel advertising by a special advertisement each day showing an unusual saving on some particular article of merchandise on that day only, and as this special advertisement will relate on different days to merchandise found on different groups of shelves, it is desirable that such special advertisement be displayed in connection with the shelves on which the specially priced article may be found. Moreover, it is necessary to provide some conspicuous means for attracting the attention of customers to the special advertisement each day.

My invention aims to provide unusually simple and inexpensive, yet efficient and desirable means whereby any desired special advertisement may be mounted on the advertising panel of any group of shelves, and whereby the attention of the customers will be unfailingly attracted to the special ad.

With the foregoing in view, the invention resides in the novel subject matter hereinafter described and claimed, the description being supplemented by the accompanying drawing.

Fig. 1 is a perspective view showing the advertising panels of three groups of shelves, the lenses with which I provide these panels, and a special advertisement carried by one panel, attention being drawn to this advertisement by illumination of the associated lens, as hereinafter described.

Fig. 2 is a vertical sectional view on line 2—2 of Fig. 1.

Fig. 3 is a fragmentary front elevation showing the preferred manner of shaping and anchoring the lenses.

Fig. 4 is a perspective view of the holder for the special advertisement which may be mounted upon any of the advertising panels.

Fig. 5 is a perspective view of the illuminator which may be mounted behind any of the lenses to draw attention to the special advertisement.

In the drawings above briefly described, the preferred form of construction has been illustrated and while this construction will be herein specifically described, it is to be understood at the outset that within the scope of the invention as claimed, numerous variations may be made.

The numerals 6 denote groups of superposed shelves having individual, merchandise-advertising panels 7 at their upper ends, preferably shaped as shown in Fig. 1. These panels carry suitable holding means 8 for merchandise advertisements 9, and above the central advertisements, I provide said panels with openings 10 from front to rear. Extending across each of these openings, is a colored glass lens 11, preferably square and held within a shallow recess 12 in the front of the panel by an annular frame 13 which is suitably secured to said panel. Each lens preferably displays the trademark of the particular self-service store with which the invention is used, as suggested in Fig. 3.

Under each lens 11, screws or the like 14 are driven into the panels 7 and project therefrom for engagement with eyes 15 on a special advertisement holder 16. This holder is provided with appropriate means 17 for holding the special advertisement 18 and by engaging the eyes 15 with the screws or the like 14 of any panel 7, the special advertisement may be located above the shelves on which the article which it advertises, may be found. Then, by means hereinafter described, the lens 11 above the special ad., is intermittently illuminated, giving the appearance of a "winking eye". These "winks" attract the customer's attention to the special ad. and the latter preferably displays the words "Special today—don't miss a wink" in addition to the actual advertisement 18. The slogan "Don't miss a wink" becomes well known to the cutomers and each day upon entering the store, they naturally look for the "winking eye" and thereunder find the specially advertised merchandise for that particular day.

Projecting rearwardly from the panels 7, over their lenses 11, are studs 19, preferably provided by driving screws into said panels. These studs are used in connection with eyes 20 on a casing 21, for the purpose of supporting this casing behind the particular lens 11, under which the special advertisement is supported. The casing is preferably in the nature of a reflector with an open front side and may well be provided with a carrying handle 22 at its rear side. Within this casing is an illuminating bulb 23 which is intermittently illuminated. This may be accomplished in any desired manner, for instance, by thermally-controlled switch means in the lamp socket 24, by an ordinary rotary switch, or otherwise. Each time the bulb is illuminated, it conspicuously illuminates the associated lens 11 and hence attracts attention to the special advertisement.

Both the advertisement holder 16 and the casing 21 may readily be moved from any panel 7 to another panel and the desired advertisement 18 may readily be inserted into said holder. To supply current to the bulb 23, its current-conducting wires 25 may be provided with a suitable plug 26 for engagement with any of a plurality of sockets (not shown).

Excellent results are obtainable from the general subject matter herein disclosed and hence it is preferably followed. However, as above stated, numerous variations may be made within the scope of the invention as claimed.

I claim:—

1. In a merchandise displaying and advertising means, groups of superposed shelves having individual merchandise advertising panels each formed with an opening from front to rear, an illuminator freely movable from any panel to another, and means for supporting said illuminator behind the opening of any panel, whereby to attract the attention of customers to the panel bearing the illuminator.

2. In a merchandise displaying and advertising means, groups of superposed shelves having individual merchandise advertising panels each formed with an opening from front to rear, a special advertisement holder freely movable from any panel to another, means for supporting said holder at the front of any panel near the opening thereof, an illuminator freely movable from any panel to another, and means for supporting said illuminator behind the opening of any panel selected to support the aforesaid holder.

3. In a merchandise displaying and advertising means, groups of superposed shelves having individual merchandise advertising panels each provided with a lens which becomes conspicuous when illuminated, an illuminator freely movable from any panel to another, and means for supporting said illuminator behind the lens of any panel selected to receive special attention of the customers.

4. In a merchandise displaying and advertising means, groups of superposed shelves having individual merchandise advertising panels each having a lens which becomes conspicuous when illuminated, a special advertisement holder freely movable from any panel to another, means for supporting said holder in front of any panel near the lens thereof, an illuminator freely movable from any panel to another, and means for supporting said illuminator behind the lens of any panel selected to carry the aforesaid special advertisement holder, whereby to attract attention to the special advertisement.

5. In a merchandise displaying and advertising means, groups of superposed shelves having individual merchandise advertising panels each provided with a lens exposed at both the front and rear sides of the panel, a stud projecting rearwardly from each panel over its lens, a casing having an eye to receive any of the studs, whereby it may be supported behind any lens, said casing having an open front, and lens illuminating means in said casing.

In testimony whereof I have hereunto affixed my signature.

JOHN FIELDS SMILEY.